United States Patent [19]

Krause et al.

[11] Patent Number: 5,714,842
[45] Date of Patent: Feb. 3, 1998

[54] AUTOMATIC CUTOFF CONTROL FOR A DC COUPLED CRT VIDEO DRIVE

[75] Inventors: Peter Krause, Singapore; Aik Keong Ong, Tampines, both of Singapore

[73] Assignee: Apple Computer, Inc., Cupertino, Calif.

[21] Appl. No.: 505,731

[22] Filed: Jul. 21, 1995

[51] Int. Cl.⁶ .................................................. H01J 29/52
[52] U.S. Cl. ........................... 315/1; 315/381; 315/383; 348/380
[58] Field of Search ..................... 315/1, 3, 381, 315/383, 384, 386, 387, 389; 348/377, 378, 380, 673, 694

[56] References Cited

U.S. PATENT DOCUMENTS

| | | | |
|---|---|---|---|
| 4,217,525 | 8/1980 | Nakamura et al. | 315/381 |
| 4,218,720 | 8/1980 | Kam et al. | 348/377 X |
| 4,438,366 | 3/1984 | Kamata | 315/12 |
| 4,651,064 | 3/1987 | Parker et al. | 315/383 |
| 4,894,725 | 1/1990 | Sendelweck | 348/380 |
| 5,189,347 | 2/1993 | Ogino et al. | 315/383 |
| 5,504,538 | 4/1996 | Tsujihara et al. | 348/673 |

*Primary Examiner*—Robert Pascal
*Assistant Examiner*—Justin P. Bettendorf
*Attorney, Agent, or Firm*—Burns, Doane, Swecker & Mathis, L.L.P.

[57] ABSTRACT

The present invention, generally speaking, provides for automatic cutoff control in a DC coupled CRT video drive using a low DC supply voltage and circuitry that is lower in power consumption than conventional circuitry for the comparable video performance. A simple, easy to implement solution is achieved with an extremely low component count. Cutoff control response is fast, allowing discontinuous operation of auto cutoff control. In one embodiment of the invention, a cutoff control signal is applied to individual CRT G1 terminals. Fast response cutoff control drive is realized using an IC current source and a single transistor current-to-voltage (CTV) converter. Supply voltage variations on the video driver are clamped via a clamping device to the negative supply voltage of the G1 CTV converter.

7 Claims, 1 Drawing Sheet

AUTOMATIC CUTOFF CONTROL FOR A DC COUPLED CRT VIDEO DRIVE

BACKGROUND OF THE INVENTION

1. Field of the Invention

The present invention relates to electron beam cutoff control in television and video display monitors using a CRT (cathode ray tube).

2. State of the Art

In television and video display monitors using a CRT (cathode ray tube), a cathode of the CRT (which is part of an electron gun) produces an electron beam. The electron beam is deflected back and forth across a display screen. A horizontal deflection current is produced in a horizontal deflection coil to create a magnetic field used to deflect the electron beam. As the electron beam is scanned back and forth across the display screen, it is modulated to produce on the display screen spots of varying luminous intensity, thus forming an image to be viewed. A high voltage, referred to as EHT (electrical high tension), is applied to an anode of the CRT and accelerates the electron beam, causing it to strike the screen at a very high speed.

In color CRTs, three different electron guns are provided, each of which is used to selectively excite one color of phosphor from among red, green and blue (R, G and B) phosphors. A red phosphor dot, a green phosphor dot and a blue phosphor dot together form a color picture element. Depending on which color phosphors are excited with what intensity, a picture element is perceived as having a certain color within a wide range of producible colors.

Each electron gun has associated with it a grid electrode, the so-called G1 grid, that may be used to control the electron beam current. The electron beam current varies in accordance with a differential voltage between the cathode and the G1 grid. Typically, the G1 grid is grounded and the cathode is driven by a modulated video signal produced by a video amplifier. With only a small positive voltage applied to the cathode, the cathode will emit a strong beam current, producing a bright spot on the CRT screen. At increasingly positive voltages, the beam current emitted becomes weaker and weaker until no electron beam current is produced. For a given picture element, if all three electron beams are off, the picture element will appear black. The voltage at which different electron guns cease to emit beam current will vary from gun to gun.

Scanning of the electron beam involves both trace and retrace portions. During trace, the electron beam is modulated by an active video signal and is scanned relatively slowly in order to "paint" picture information on the screen. The beam is then shut off, or "blanked," during retrace and returned rapidly from the end of one horizontal line to the start of the next line. During blanking, the differential voltage measured from cathode to the G1 grid must be sufficiently high to assure that the beams from each of the electron guns will be cut off.

Automatic cutoff control requires automatically controlling the differential voltage from cathode to grid during retrace without any input from the user so as to ensure cutoff. The manner in which automatic cutoff control is implemented will depend on how the video input of the CRT is driven. The video drive signal may be coupled directly to the CRT video input, i.e., DC coupled. Alternatively, the video drive signal may be coupled AC coupled to the CRT video input, through a capacitor or capacitive network. In the latter instance, relative brightness information is preserved, but absolute brightness information is lost. Therefore, the signal applied to the video input must be level shifted so as to reinsert the DC component that was lost through AC coupling. This process is known as DC reinsertion. AC coupling with DC reinsertion is the most common method of driving the video input of a color CRT display. To implement automatic cutoff control using AC coupling with DC reinsertion, a control signal can be applied through the video signal or by varying the DC restoration voltage itself.

To apply the control signal through the video signal, a much more complex circuit is required to achieve accurate and fast response of the cutoff control voltage. Basically, a control signal is inserted into the video signal immediately following the vertical blanking pulse. With the restoration voltage held constant, the biasing of the whole video voltage swing is changed in order to keep the black level constant, thereby realizing automatic black level/cutoff control. The alternative, varying the DC restoration voltage, is not completely effective in maintaining the control signal reference or blanking level.

Whichever of the foregoing approaches is used, the use of AC coupling complicates sensing of the electron beam current, a desirable feature in a high performance monitor. In a color monitor, just as in mixing paints, to obtain the desired color, the constituent colors (R, G and B beam currents) must be mixed in the correct proportions. Beam current is determined by the cathode to grid voltage but is tube dependent and varies for each electron gun. Current sensing allows for calibration of the monitor to ensure color accuracy.

Using DC coupling, as opposed to AC coupling, current sensing is greatly simplified. A high voltage, DC coupled drive approach is known, but has in the past only been used for low resolution video applications, such as TV. In high resolution monitor applications, the video amplifier must be capable of driving the video signal between brightness extremes (a span of about 45–55V) in a very short period of time, about 5 ns. For the video amplifier to further provide the correct blanking voltage level of about 100V has proven to be unrealizable using current technology.

In particular, a high voltage, DC coupled drive approach requires DC supply headroom for the video signal, brightness adjustment, cutoff adjustment and automatic cutoff control. More power consumption and lower performance therefore result. Using DC coupling, therefore, video performance has been significantly limited by the power consumption of the video driver. Similarly, in the case of an AC coupled system in which a control signal is applied through the video signal, more DC voltage supply headroom is required for the video driver, although not as much as in the high voltage, DC coupled drive approach.

SUMMARY OF THE INVENTION

The present invention, generally speaking, provides for automatic cutoff control in a DC coupled CRT video drive using a low DC supply voltage and circuitry that is lower in power consumption than conventional circuitry for the comparable video performance. A simple, easy to implement solution is achieved with an extremely low component count. Cutoff control response is fast, allowing discontinuous operation of auto cutoff control. In one embodiment of the invention, a cutoff control signal is applied to individual CRT G1 terminals. Fast response cutoff control drive is realized using an IC current source and a single transistor current-to-voltage (CTV) converter. Supply voltage variations on the video driver are clamped via a clamping device to the negative supply voltage of the G1 CTV converter.

3

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

In accordance with the present video drive arrangement, the DC coupled video driver provides the video drive signal to the cathode only. Sensing of the beam current is achieved through a single PNP transistor. Cutoff control for the individual RGB beams is applied through voltages applied to the respective G1 grids of the beams.

The control of this voltage is realized through an adjustable current source in the video preamp IC. The current is then passed through a single PNP transistor to achieve the necessary voltage swing of about 40V, to control the respective G1 grids of the color CRT. Discontinuous operation of the cutoff control loop requires a stable video supply voltage. To eliminate the inevitable power loss which would result from stabilizing the video supply voltage (due to the high power consumption of the video amplifier), a simple clamping device clamps the changing video supply voltage to the negative supply of the CTV converter, hence keeping the differential voltage between cathode and G1 constant with respect to supply voltage variations.

Figure 1:
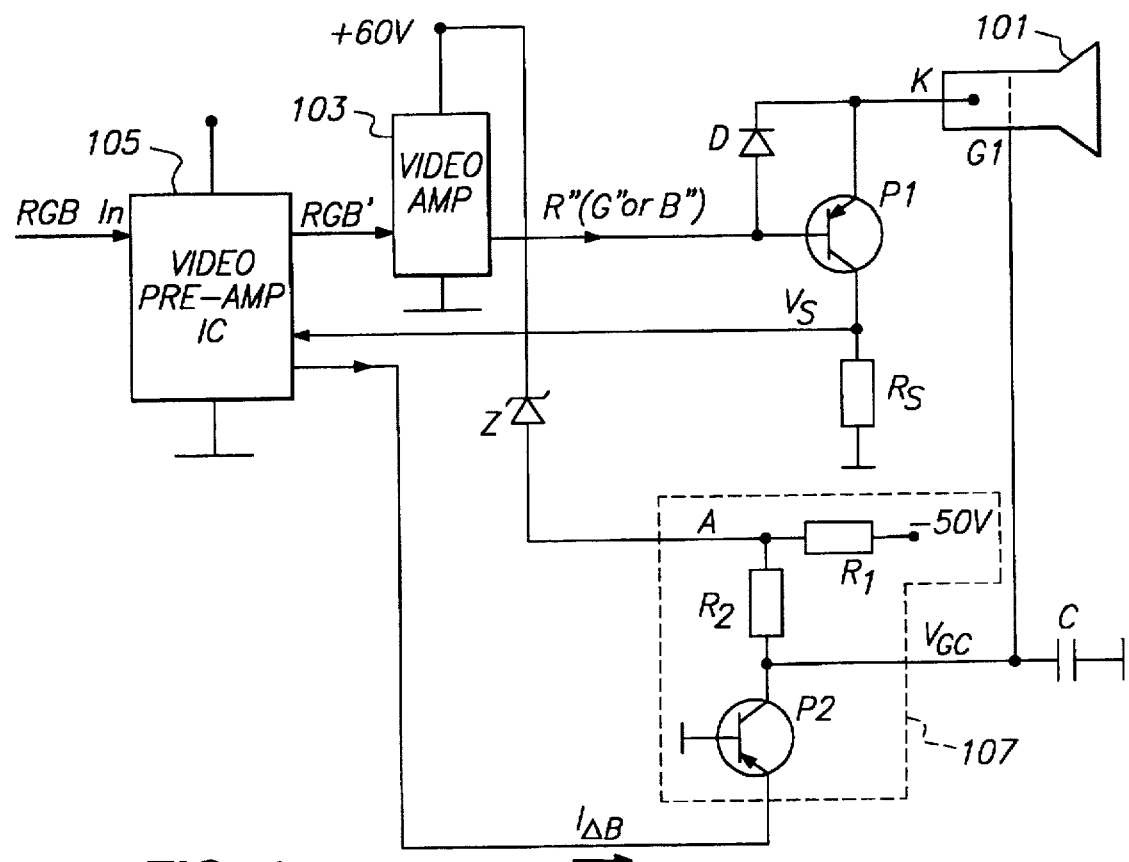
FIG. 1 is a diagram of a DC coupled, automatic cutoff controlled CRT video drive circuit in accordance with an embodiment of the present invention.

Referring now to FIG. 1, a schematic diagram of a DC coupled, automatic cutoff controlled CRT video drive circuit in accordance with an embodiment of the present invention is shown. A CRT 101 has a cathode and a control grid G1. Although the cathode and control grid for only a single electron gun (red) are shown, the identical arrangement is made with respect to a second (green) and a third (blue) electron gun, the cathodes and control grids of which are not shown. The control grid G1 is coupled through a capacitor C to ground to mitigate the effects of stray cathode to grid coupling.

An RGB video input signal RGB In is applied to a video preamplifier integrated circuit ("preamp IC") 105. The preamp IC 105 amplifies the video signal to produce an amplified signal RGB', which is applied to a final video amplifier 103. In order to meet the fast rise time requirements of a high resolution color monitor, the video amp is operated from a voltage supply of, in the illustrated embodiment, 60V, considerably less than the 100 to 110V required for cutoff control. The video amplifier further amplifies the video input signal to produce signal R", B" and G", of which only the signal R" is shown.

The amplified video signal R" is DC coupled to the cathode K of the CRT 101 through a diode D. Direct DC coupling of the video signal to the cathode K allows for simple current monitoring using a single P-type transistor P1. The base of the transistor P1 is connected to the video signal R", and the emitter of the transistor P1 is connected to the cathode K. The collector of the transistor P1 is connected through a sense resistor $R_s$ to ground. A voltage $V_s$ is produced across the resistor $R_s$, and is input to the preamp IC 105.

In accordance with a preferred embodiment, the preamp IC performs automatic cutoff control on a discontinuous,

4 once per frame basis. At the start of each frame, the portion of the video signal corresponding to the first line of the frame is replaced with a known video signal expected to produce certain red, green and blue beam currents. For example, a white line of a certain brightness might, for a particular set, be expected to produce red, green and blue beam currents of 5.0, 4.2 and 4.85 μA, respectively, based on factory calibration. Because of power supply variations, aging effects, etc., beam currents different than those expected will be measured. The respective cathode to grid voltages for each of the electron guns is the adjusted to yield the correct beam current.

In order to correct the respective beam currents, a current to voltage (CTV) converter 107 is used. The CTV converter 107 is connected to the preamp IC 105 and receives from the preamp IC a control current $I_{AB}$. The CTV converter 107 is also connected to the control grid G1. The CTV converter 107 converts the control current $I_{AB}$ to a grid control voltage $V_{GC}$, which changes the cathode to grid voltage appropriately so as to produce the correct beam current.

The CTV converter is formed by a negative voltage supply (as shown, −50V), a resistive divider network R1 and R2, and a P-type transistor P2. The base of the transistor P2 is connected to ground, and the emitter of the transistor P2 is connected to received the current control current $I_{AB}$. The collector of the transistor P2 is connected to the control grid G1 and is also connected through the resistive divider network to the negative supply voltage. As the current control current $I_{AB}$ increases, the voltage $V_{GC}$ increases (becomes less negative), and vice versa. Assuming a combined resistance of 20 kΩ and a current that may be varied from 0 to 1.6 mA, for example, the voltage $V_{GC}$ is then adjustable through a range of 32V.

Since operation of the cutoff control loop is discontinuous, a stable video supply voltage is required to ensure correct color reproduction. This requirement is satisfied in FIG. 1 using a Zener diode Z connected between the node A and the video supply voltage (+60V). The voltage at node A follows variations in the video supply voltage such that the differential voltage between the cathode and the grid remains unchanged.

Figure 2:
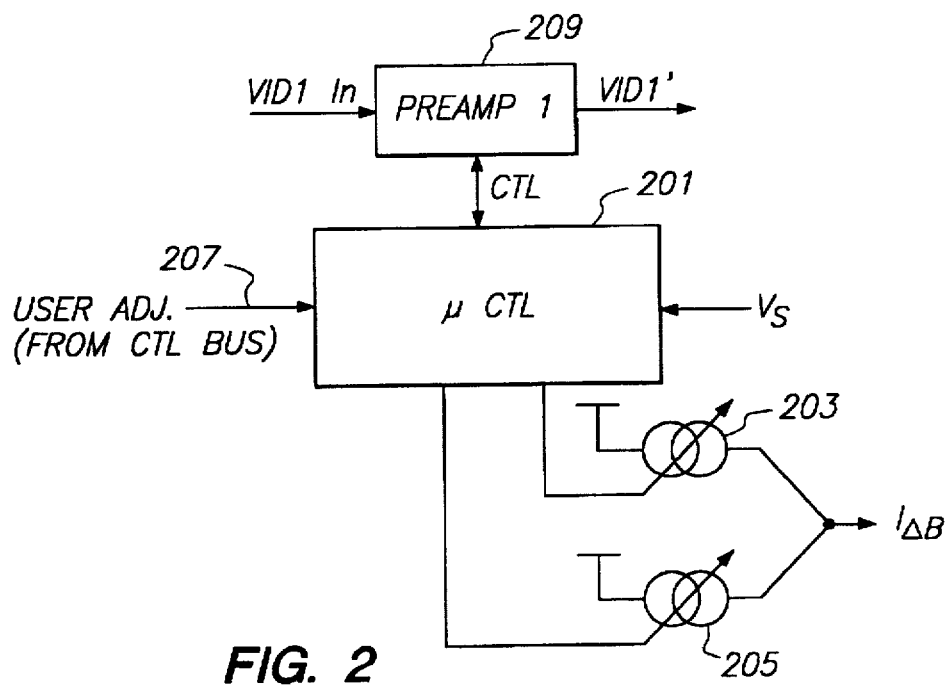
FIG. 2 is a schematic diagram of a portion of the preamplifier IC of FIG. 1.

Referring to FIG. 2, a portion of the preamp IC 105 pertaining to a single video channel is shown in greater detail. A microcontroller 201 or other control logic circuit controls two adjustable current sources 203 and 205, the output currents or which are combined to form the current control current $I_{AB}$. One of the current sources 203, 205 is controlled in accordance with the sense voltage $V_S$. The other one of the current sources 203, 205 is controlled in accordance with a user-adjustable input signal 207 received from a control bus. A corresponding user adjustment provides for tint control within a limited range.

The microcontroller is also connected to a preamplifier block Preamp1 for a first video input channel VID1 In, which produces an output signal VID1'. The microcontroller 201 exercises control over the preamplifier block, possibly in conjunction with automatic cutoff control processing.

The foregoing arrangement allows for both current sensing and automatic cutoff control to be very economically realized without increasing either the power or performance requirements of the video amplifier. The cutoff control arrangement produces a fast response. Furthermore, by making the differential cathode to grid voltage independent of video power supply changes, discontinuous automatic cutoff control may be performed while maintaining high performance.

It will be appreciated by those of ordinary skill in the art that the invention can be embodied in other specific forms without departing from the spirit or essential character thereof. The disclosed embodiments are therefore considered in all respects to be illustrative and not restrictive. The scope of the invention is indicated by the appended claims, and all changes which come within the meaning and range of equivalents thereof are intended to be embraced therein.

What is claimed is:

1. Apparatus comprising:

a video amplifier connected to a first voltage source for producing a video out-put signal;

DC coupling means for, during operation, applying said video output signal to a cathode of a CRT;

bias means connected to a second voltage source for producing a negative voltage;

means for, during operation, applying said negative voltage to a cutoff-control grid of a CRT; and regulating means, including a zener diode, connected between said bias means and said first voltage source for causing variations in said first voltage source to be reflected in a level of said negative voltage so as to reduce beam current variations during operation of said CRT.

2. The apparatus of claim 1, further comprising:

control means connected to said bias means for automatically varying said negative voltage.

3. The apparatus of claim 2, further comprising:

sense means connected to said cathode for sensing an electron beam current emitted by said cathode and for producing a sense signal proportional to said electron beam current;

wherein said control means is responsive to said sense signal for automatically varying said negative voltage.

4. The apparatus of claim 3, wherein said bias means comprises a current to voltage converter.

5. The apparatus of claim 4, wherein said control means comprises a control logic circuit and a first adjustable current source, said control logic circuit adjusting a current produced by said first adjustable current source in accordance with said sense signal.

6. The apparatus of claim 5, wherein said control means is connected to a user adjustable signal and further comprises a second adjustable current source, said control logic circuit adjusting a current produced by said second adjustable current source in accordance with said user adjustable signal.

7. The apparatus of claim 6, wherein a current produced by said first adjustable current source and a current produced by said second adjustable current source are summed to form a resultant current, which is input to said current to voltage converter.

* * * * *